United States Patent Office 3,418,245
Patented Dec. 24, 1968

3,418,245
FUEL MATERIALS FOR NUCLEAR REACTORS
Denis William John Hazelden, Bishop's Stortford, John Jephson Norreys, Derby, and Michael John Wheeler, Garston, Watford, England, assignors to General Electric Company Limited, London, England, a British company
No Drawing. Filed May 1, 1967, Ser. No. 634,818
Claims priority, application Great Britain, May 2, 1966, 19,220/66
2 Claims. (Cl. 252—301.1)

ABSTRACT OF THE DISCLOSURE

A fuel material for a nuclear reactor is composed of uranium or plutonium, or both uranium and plutonium, together with niobium and carbon, in relative atomic proportions substantially in the range of $(51-x)$ percent $M:x$ percent niobium:49% carbon to $(48-x)$ percent $M:x$ percent niobium:52% carbon, wherein M consists of uranium and/or plutonium and the value of $x$ is in the range of 0.1 to 8.0 atomic percent, the fuel material consisting wholly or mainly of a solid solution of niobium monocarbide with uranium monocarbide and/or plutonium monocarbide. Several methods of manufacturing the fuel materials are described.

---

This invention relates to materials suitable for use as fuels in nuclear reactors, and to methods of manufacturing such materials.

Uranium monocarbide has already been proposed for use as a fissile fuel material in nuclear reactors. However, a difficulty sometimes arises in operation of a fuel element comprising fuel composed of this material, in that gases generated at the operating temperature form bubbles which are liable to cause damage to or deformation of the mass of fuel. It would appear that this difficulty could be reduced or overcome if improved creep resistance could be imparted to the fuel material, and it is an object of the present invention to provide a fuel material of novel composition which possesses improved creep properties as compared with those of substantially pure uranium monocarbide.

According to one aspect of the invention, a fuel material for a nuclear reactor is composed of uranium, niobium and carbon in relative atomic proportions substantially in the range of $(51-x)$ percent U:$x$ percent Nb:49% C to $(48-x)$ percent U:$x$ percent Nb:52% C, where the value of $x$ is in the range of 0.1 to 8.0 atomic percent, and consists wholly or mainly of a (uranium, niobium) monocarbide solid solution.

It will be appreciated that the compound generally referred to as "uranium monocarbide" is not necessarily of stoichiometric composition, but may contain excess carbon or excess uranium. Thus the uranium carbide of the fuel material of the invention may be stoichiometric uranium monocarbide, that is to say may contain 50 at. percent of carbon, or may be of hyperstoichiometric composition containing up to 52 at. percent of carbon, or of hypostoichiometric composition containing down to 49 at. percent of carbon, as indicated above. The niobium may be regarded as partially replacing uranium in the uranium carbide lattice to form a (U, Nb)C solid solution, the same considerations with regard to stoichiometry being applicable to this solid solution as those indicated above in respect of uranium monocarbide.

We have found that the partial replacement of uranium by niobium, in the proportions specified above, in uranium monocarbide produces a marked increase in the creep resistance of the latter, and that this improvement is not appreciably affected by the presence of a small excess of carbon or of uranium over the stoichiometric proportions, within the limits specified above, that is to say up to 2 at. percent excess carbon or up to 1 at. percent excess uranium.

According to a second aspect of the invention, the nuclear reactor fuel materials as described may be modified by partial or complete replacement of the uranium by plutonium in equivalent atomic proportions, the range of proportions of niobium, referred to above, being unchanged. The materials will then consist wholly or mainly of (plutonium, niobium) monocarbide and (uranium, plutonium, niobium) monocarbide solid solutions, the niobium partially replacing plutonium, in the first case, and in the second partially replacing uranium or plutonium or both, respectively in the plutonium carbide and (uranium, plutonium) carbide lattices. The incorporation of niobium in plutonium monocarbide and in (uranium, plutonium) monocarbide in this way results in an increase in the creep resistance of the plutonium monocarbide and the (uranium, plutonium) monocarbide, similar to that obtained in the case of uranium monocarbide.

It is to be understood that the compositions specified above for the fuel materials of the invention do not exclude the presence of minor amounts of impurities, which may be accidentally introduced either from the starting materials employed in the manufacture of the fuel materials or during the manufacturing process, and which have no detrimental effect on the properties of the fuel materials.

The fuel material in accordance with the first aspect of the invention is preferably manufactured by arc melting a mixture of uranium, carbon and niobium, in the required relative proportions. It is possible to introduce the niobium by using a niobium electrode for the arc melting of a uranium-carbon mixture; however, it is preferred to use a graphite electrode, and to include the required amount of niobium in the initial mixture, since the proportion of niobium introduced into the fuel material can be controlled more precisely in this way. As an alternative to using a mixture of uranium and carbon, preformed uranium monocarbide can be used as a starting material. The starting materials may be in powder form, or may be in the form of larger pieces.

The molten mass produced by any of the above arc melting methods may be cast to form a body of a desired shape and size: for example, for the manufacture of fuel elements for nuclear reactors, the melt can be cast into cylindrical moulds of the required dimensions.

Another possible method of manufacturing the fuel materials of the invention comprises pressing a powdered mixture of uranium, carbon and niobium, or of uranium monocarbide and niobium, in the required proportions, to form a compact of a desired shape and size, and sintering the compact.

The modified materials in accordance with the second aspect of the invention can be manufactured by any of the methods described above, the uranium or uranium monocarbide employed as a starting material being partly or wholly replaced by plutonium or plutonium monocarbide In all the above methods of manufacture, the cast or sintered bodies are preferably cooled slowly, in the furnace in which they have been produced, to avoid cracking as a result of thermal stress.

It will be understood that the range of relative atomic proportions of uranium, niobium and carbon specified in the above statement of the first aspect of the invention, and also applicable to the modified materials of the second aspect of the invention wherein part or all of the uranium is replaced by plutonium, refers to the nominal composition of the fuel material, that is to say the composition based on the relative proportions of the starting materials used, assuming that no change in these relative proportions occurs during manufacture of the fuel material.

In some cases, however, where the starting mixture is arc melted using a graphite electrode, an increase in the carbon content of the melt may occur as a result of the incorporation therein of a small amount of carbon from the electrode, so that the actual composition of the product will differ slightly from the nominal composition and may even fall just outside the composition range specified. The term "substantially" employed in the aforesaid statement with reference to the range of relative atomic proportions of the constituents is intended to imply only the possibiliies of such minor discrepancies arising in this way.

Metallographic and X-ray examinations of the uranium-niobium-carbon fuel materials produced by the methods described above have shown that the materials consist substantially of a (U, Nb)C solid solution in which the overall relative proportions of uranium and niobium are within the limits specified above, depending upon the composition of the starting mixture, although this solid solution phase shows some coring, that is to say inhomogeneity of composition, due to non-uniformity of distribution of the niobium within the solid solution. In some cases the material consists of a single solid solution phase as aforesaid; in other cases the material includes, in addition to the main solid solution phase, a small amount of one or more other phases which, depending upon the initial proportions of the constituents employed, within the above-mentioned limits, and upon the amount of carbon taken up from a graphite electrode if used, may consist of excess carbon, or of excess uranium, or uranium carbides other than the monocarbide, for example $UC_2$ or $U_2C_3$.

The cast or sintered bodies of fuel material may, if desired, be subjected to an annealing heat treatment at a temperature up to 1700° C. and for a period of time up to 16 hours, followed by slow cooling: such treatment does not eliminate the cored structure of the solid solution phase, which, however, is not detrimental to the properties of the material.

One specific method which we have employed for the manufacture of a nuclear fuel material in accordance with the invention will now be described by way of example.

In the method of the example a mixture of reactor grade uranium and reactor grade graphite, both in lump form and in the relative proportions of 48 at. percent uranium and 50 at. percent graphite, together with 2 at. percent of niobium in the form of pieces of niobium sheet, was placed on a water-cooled copper hearth in an argon arc melting furnace, and was subjected to an arc melting procedure in known manner, using a graphite cathode. The molten mass was drop-cast into polished graphite moulds, and the castings were held at a temperature of 1400° C. in argon at a pressure of 200 mm. of mercury for one hour and then retained in the furnace while the latter was cooled to room temperature in 1½ hours, this rate of cooling being sufficiently slow to avoid cracking of the cast body due to thermal stress.

Examination of the product of the method of the example showed that the material consisted of a (U, Nb)C solid solution with the cored structure referred to above, together with a small amount of uranium dicarbide uniformly distributed throughout the material. The actual composition of the material was found by chemical analysis to be 51.14 at. percent carbon, 1.36 at. percent niobium, and 47.50 at. percent uranium, indicating that some carbon had been taken up from the graphite cathode, with minor impurities consisting of less than 200 parts per million each of oxygen and nitrogen and less than 20 parts per million of hydrogen.

Creep tests have been carried out on the product of the method described in the above example, and on further materials made by the same method but including varying proportions of niobium: the results of these tests are given in the following table, in which the material produced by the method of the above example is designated as Specimen 3. The property determined in each case was the compressive creep, that is to say the rate of reduction in length of a rod of the material under an applied load and at an elevated temperature.

For carrying out the creep test, a rod of the material to be tested, 0.3 inch long and 0.18 inch in diameter, was supported in a vertical position by a tungsten anvil set in a water-cooled mild steel pedestal which rested on the base plate of a vacuum chamber, and a load was applied to the upper end of the test specimen through a tungsten push-rod, in order to provide good electrical connection to the specimen. The test specimen was heated by the direct passage of an electric current through it, after evacuation of the chamber: the test temperature was attained in a period of 40 to 50 minutes, and the specimen was held at this temperature for an hour to allow the system to approach thermal equilibrium. The load was then increased to the desired value, the temperature and the load were kept constant for a number of hours, and the reduction in length of the specimen during this time was observed by means of a dial gauge placed between the tungsten push-rod and the base plate. It was found that after a few hours the rate of deformation of the specimen, as indicated by the rate of reduction in length, became substantially constant: the figure given in the extreme right-hand column of the table below, for each specimen, in this constant rate of reduction in length, referred to as the "minimum creep rate" (m.c.r.) per hour, under the load and at the temperature indicated in the proceding columns. For comparison, corresponding figures are given for a specimen (Specimen 6) of uranium monocarbide containing 1 at.percent excess carbon: this uranium carbide specimen was tested in the same manner as the niobium-containing specimens 1 to 5.

TABLE

| Specimen | Nominal composition | | | Test load lbs./in.$^{-2}$ | Test temperature, °C. | M.c.r. hour$^{-1}$ |
|---|---|---|---|---|---|---|
| | U at. percent | C at. percent | Nb at. percent | | | |
| 1 | 45 | 50 | 5 | 6,000 | 1,400 | $4.7 \times 10^{-6}$ |
| 2 | 48 | 50 | 2 | 6,000 | 1,400 | $1.25 \times 10^{-5}$ |
| 3 | 48 | 50 | 2 | 6,000 | 1,500 | $1.4 \times 10^{-5}$ |
| 4 | 49 | 50 | 1 | 6,000 | 1,400 | $2.4 \times 10^{-4}$ |
| 5 | 49 | 50 | 1 | 6,000 | 1,400 | $4.5 \times 10^{-5}$ |
| 6 | 49 | 51 | 0 | 6,000 | 1,400 | $5.3 \times 10^{-5}$ |

Of the specimens referred to in the above table, all except Specimen 6 showed marked coring, Specimen 4 consisted of a single phase, which was a solid solution of uranium niobium monocarbide, and the other specimens consisted mainly of a said solid solution and contained small amounts of an additional phase, which in the case of Specimen 5 was free uranium, and in the cases of the remaining specimens was uranium dicarbide.

Thus it is apparent from the minimum creep rate figures in the table that the partial replacement of uranium in uranium monocarbide by niobium results in a marked improvement in the creep resistance of the material, which improvement was effectively maintained even when small amounts of phases other than the (U, Nb) C solid solution were present in the material.

We claim:
1. A fuel material for a nuclear reactor, which material is composed of at least one metal which is a member of the group consisting of uranium and plutonium, together with niobium and carbon, the said metal, niobium and carbon being present in relative atomic proportions substantially in the range of $(51-x)$ percent M:$x$ percent niobium:49% carbon to $(48-x)$ percent M:$x$ percent niobium:52% carbon, wherein M consists of at least one metal of the said group and the value of $x$ is in the range of 0.1 to 8.0 atomic percent, and which material consists essentially of a solid solution of niobium monocarbide and at least one monocarbide of a metal of said group.

2. A fuel material according to claim 1, which consists of uranium, carbon and niobium in the relative atomic proportions of 48 at.percent uranium, 50 at.percent carbon, and 2 at.percent niobium.

References Cited

UNITED STATES PATENTS

| | | | |
|---|---|---|---|
| 3,207,697 | 9/1965 | Benesovsky et al. | 252—301.1 |
| 3,275,564 | 9/1966 | Pascard | 252—301.1 |

OTHER REFERENCES

Nuclear Science Abstracts, vol. 18, No. 17, September 1964, Abstract No. 30, 142.

Reactor Materials, vol. 6, No. 4, Winter 63–64, p. 30.

Reactor Materials, vol. 8, No. 4, Winter 65–66, p. 190.

CARL D. QUARFORTH, *Primary Examiner.*

MELVIN J. SCOLNICK, *Assistant Examiner.*

U.S. Cl. X.R.

75—122.7; 176—89